(12) United States Patent
Kang

(10) Patent No.: US 8,794,473 B2
(45) Date of Patent: Aug. 5, 2014

(54) CONSOLE BOX

(75) Inventor: Yong Gu Kang, Cheonan-si (KR)

(73) Assignee: Nifco Korea Inc., Cheonan-si, Chungcheongnam-do (KR)

( * ) Notice: Subject to any disclaimer, the term of this patent is extended or adjusted under 35 U.S.C. 154(b) by 0 days.

(21) Appl. No.: 13/476,537

(22) Filed: May 21, 2012

(65) Prior Publication Data

US 2012/0319422 A1 Dec. 20, 2012

(30) Foreign Application Priority Data

May 19, 2011 (KR) .................. 10-2011-0047437

(51) Int. Cl.
*B65D 45/22* (2006.01)
*B65D 45/20* (2006.01)
*B65D 45/16* (2006.01)

(52) U.S. Cl.
CPC .............. *B65D 45/22* (2013.01); *B65D 45/20* (2013.01); *B65D 45/16* (2013.01)
USPC ........................... 220/326; 220/830; 220/827

(58) Field of Classification Search
CPC ................. E05Y 2900/20; E05Y 2201/416; E05Y 2201/404; B60R 2011/007; B65D 45/20; B65D 45/22; B65D 45/16
USPC ......... 220/830, 827, 810, 326, 324, 315, 200; 296/24.34
IPC ............ B65D 43/22, 43/16, 43/14; B60R 13/00
See application file for complete search history.

(56) References Cited

U.S. PATENT DOCUMENTS

| | | | | |
|---|---|---|---|---|
| 4,688,695 A | * | 8/1987 | Hirohata | 49/364 |
| 5,067,625 A | * | 11/1991 | Numata | 220/827 |
| 5,520,313 A | * | 5/1996 | Toshihide | 224/539 |
| 7,063,225 B2 | * | 6/2006 | Fukuo | 220/264 |
| 7,065,829 B2 | * | 6/2006 | Okabayashi et al. | 16/51 |
| 7,451,888 B2 | * | 11/2008 | Tanaka | 220/263 |
| 7,527,166 B2 | * | 5/2009 | Kondo | 220/825 |

(Continued)

FOREIGN PATENT DOCUMENTS

| | | | | |
|---|---|---|---|---|
| JP | 2005299312 A | * | 10/2005 | E05F 3/16 |
| WO | WO 2007111094 A1 | * | 10/2007 | F16F 9/12 |

OTHER PUBLICATIONS

Translation of JP 2005299312 (Arakawa), Oct. 27, 2005, Paragraphs 9 and 15.*

*Primary Examiner* — Robert J Hicks
(74) *Attorney, Agent, or Firm* — Manabu Kanesaka

(57) ABSTRACT

A console box includes a housing defining an article accommodating space therein and having an opening formed at a front side thereof; a cover coupled to the front side of the housing via hinge couplers disposed at opposite sides of the cover; dampers, each being disposed between each of the hinge couplers of the cover and the housing and controlling an opening speed of the cover; and a torsion spring disposed between each of the hinge couplers of the cover and the housing and elastically supporting the cover. The console box further includes a hinge cover disposed outside each of the hinge couplers of the cover and preventing the cover and the torsion spring from separating from each other.

6 Claims, 3 Drawing Sheets

(56) References Cited

U.S. PATENT DOCUMENTS

| | | | |
|---|---|---|---|
| 7,621,419 B2* | 11/2009 | Fukuo | 220/264 |
| 7,731,254 B2* | 6/2010 | Lota | 296/24.34 |
| 2003/0080131 A1* | 5/2003 | Fukuo | 220/264 |
| 2005/0023089 A1* | 2/2005 | Okabayashi et al. | 188/82.2 |
| 2006/0290144 A1* | 12/2006 | Nakaya | 292/262 |
| 2007/0119852 A1* | 5/2007 | Matsunaga et al. | 220/200 |
| 2010/0102061 A1* | 4/2010 | Hamaguchi | 220/255 |
| 2012/0104011 A1* | 5/2012 | Tsunoda | 220/810 |
| 2012/0318796 A1* | 12/2012 | Doll | 220/211 |

* cited by examiner

CONSOLE BOX

BACKGROUND

1. Technical Field

The present invention relates to a console box, and more particularly, to a console box, which includes a cover hingably coupled to a front side of a housing via a double hinge placed at hinge coupling points between the housing and the cover such that a rotation trace and a degree of cover protrusion can be reduced in a completely open state.

2. Description of the Related Art

Generally, a car is provided with a console box in a console or an inner panel of the car to accommodate articles. Such a console box generally includes a housing to accommodate articles, and a cover hingably coupled to a front side of the housing. In such a console box, the cover is elastically supported by a torsion spring to be automatically rotated when the cover is changed from a locked state to an unlocked state. Such a console box including the rotatable cover is provided with a one-point hinge structure for hinge connection between the housing and the cover. However, there is a difficulty in application of the one-point hinge structure to a structure which needs a small rotation trace, i.e. which has a small rotational range, to a thing or object in front of the cover and a small cover protrusion in a completely open state.

SUMMARY OF THE INVENTION

The present invention is conceived to solve the problems of the related art as described above, and is aimed at providing a console box, which employs a double hinge to provide a small rotation trace of a cover in the case where it is difficult to use a one-point hinge structure due to a small gap of a rotation trace between the cover and an object in front of the cover.

The present invention is also aimed at providing a console box providing a smaller degree of cover protrusion in a completely open state of the cover.

In accordance with an aspect of the present invention, a console box includes a housing defining an article accommodating space therein and having an opening formed at a front side thereof; a cover coupled to the front side of the housing via hinge couplers disposed at opposite sides of the cover; dampers, each being disposed between each of the hinge couplers of the cover and the housing and controlling an opening speed of the cover; and torsion springs, each being disposed between each of the hinge couplers of the cover and the housing and elastically supporting the cover. The console box further includes hinge covers disposed outside the hinge couplers of the cover and preventing the cover and the torsion spring from separating from each other.

The housing may include first arcuate external gears disposed at opposite sides thereof, and second arcuate internal gears disposed outside the first external gears to be concentric with the first external gears, and the cover may include third external gears formed on circumferences of the hinge couplers at opposite sides of the cover to engage with the first external gears.

The damper may be secured to an inner side of each of the hinge couplers, and be formed on an inner surface thereof with a fourth external gear engaging with the second internal gear of the housing and arranged concentric with the third external gear.

As such, the console box according to the present invention employs a two-point hinge structure for rotating a cover such that a rotation trace of the cover and a degree of cover protrusion in a completely open state can be reduced, and employs a damper so that not only the rotation of the cover can be stably supported but also opening speed of the cover can be adjusted.

DETAILED DESCRIPTION

Next, embodiments of the present invention will be described in detail with reference to the accompanying drawings.

Figure 1:
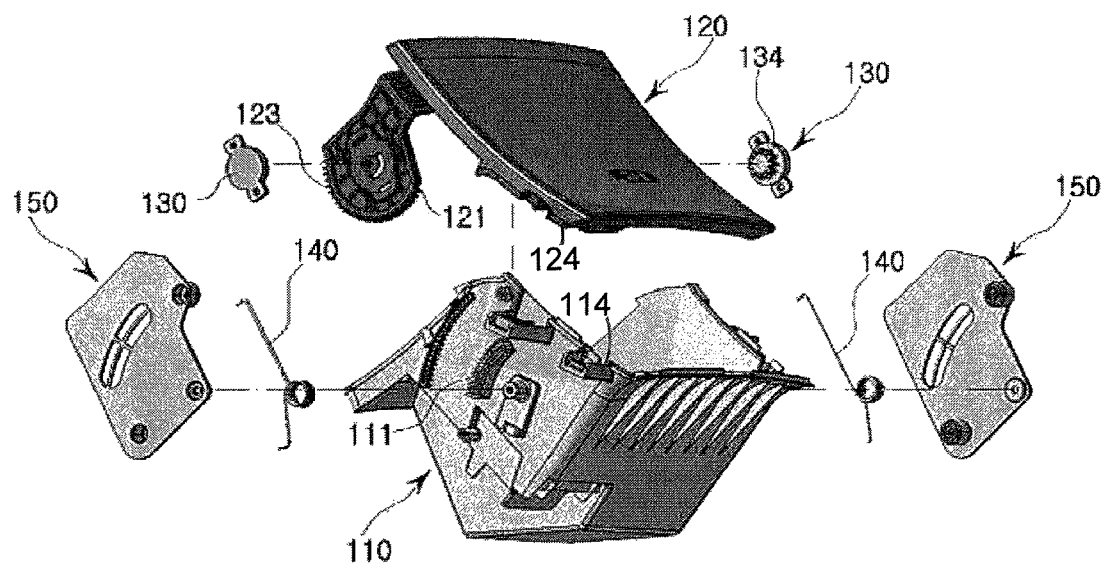
FIG. 1 is an exploded perspective view of a console box according to one embodiment of the present invention.
Figure 2:
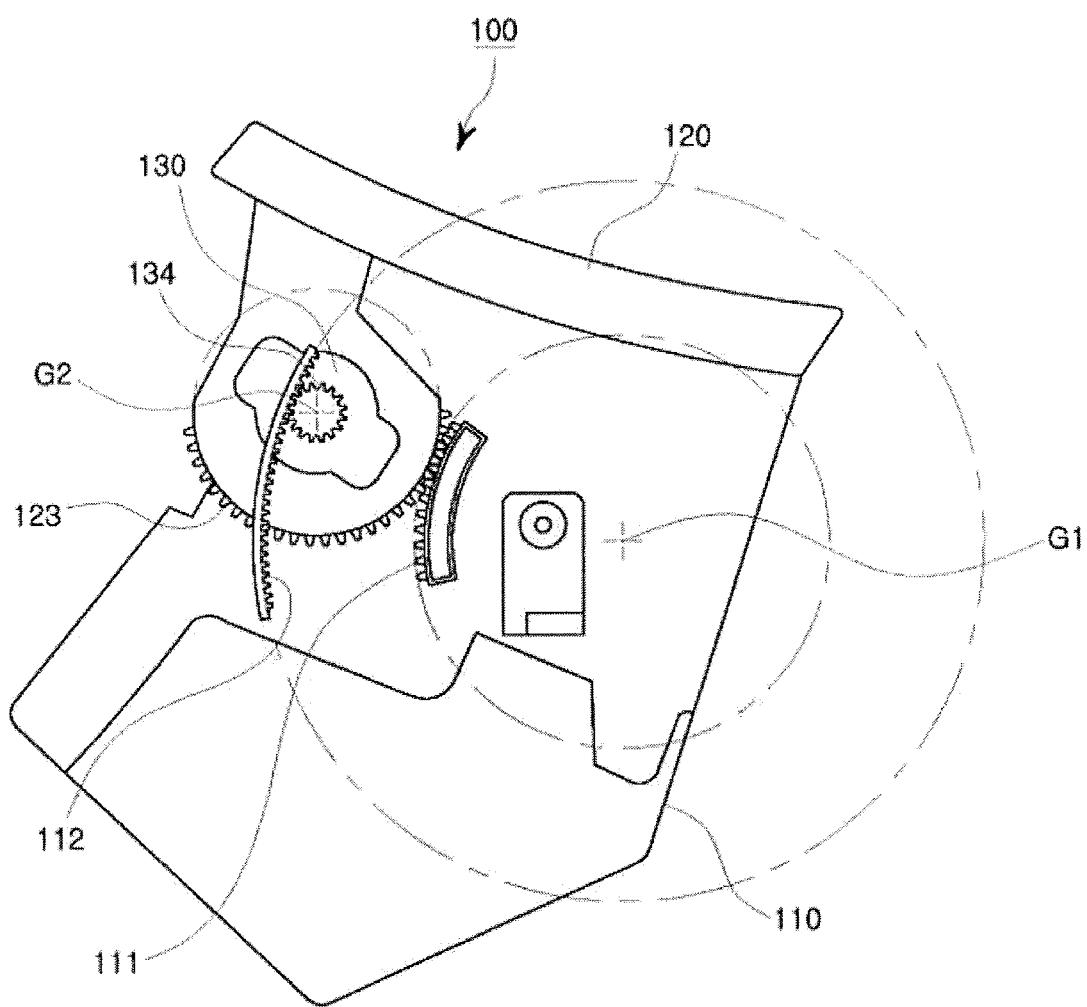
FIG. 2 is a side view of the console box according to the embodiment of the present invention.

FIG. 1 is an exploded perspective view of a console box according to one embodiment, and FIG. 2 is a side view of the console box according to the embodiment.

The console box according to the embodiment of the invention may include: a housing 110 defining an article accommodating space therein and having an opening formed at a front side thereof; a cover 120 coupled to the front side of the housing 110 through hinge couplers 121 disposed at opposite sides of the cover 120; a damper 130 disposed between each of the hinge couplers 121 of the cover 120 and the housing 110 and controlling an opening speed of the cover 120; and a torsion spring 140 disposed between each of the hinge couplers 121 of the cover 120 and the housing 110 and elastically supporting the cover 120.

The console box may further include a hinge cover 150 disposed outside each of the hinge couplers 121 of the cover 120 to prevent the cover 120 and the torsion spring 140 from separating from each other.

In the console box according to this embodiment, the housing 110 includes first arcuate external gears 111 disposed at opposite sides thereof, and second arcuate internal gears 112 disposed outside the first external gears 111 to be concentric with the first external gears 111.

The cover 120 for opening or closing the front opening of the housing 110 includes third external gears 123 formed on the circumferences of the hinge couplers 121 at opposite sides of the cover 120 to engage with the first external gears 111.

The cover 120 further includes a hook portion 124 at a front side edge thereof to be able to engage an engaging portion 114 formed at an upper side of the housing 110. When the cover 120 is closed, the hook portion 124 engages the engaging portion 114 of the housing 110 to maintain the cover at a locked state. When the cover 120 is urged to an opening direction, the hook portion 124 disengages from the engaging portion 114 to allow the cover to open by the torsion spring 140.

The damper 130 is secured to an inner side of each of the hinge couplers 121 of the cover 120, and is formed on an inner surface thereof with a fourth external gear 134 engaging with the second internal gear 112 of the housing 110 and arranged concentric with the third external gear 123.

With such a configuration, the console box according to the embodiment of the present invention employs a two-point hinge structure, wherein the housing 110 is provided with the first external gears 111 and the second internal gears 112 having a first hinge axis G1, the cover 120 is provided with the third external gears 123 having a second hinge axis G2, and the damper 130 is provided with the fourth external gears 134 having the second hinge axis G2. Thus, the first external gears 111 of the first hinge axis G1 engage with the third external gear 123 of the second hinge axis G2, and the fourth external gears 134 of the second hinge axis G2 engage with the second internal gear 112 of the first hinge axis G1.

Therefore, when opening the cover 120, the third external gears 123 of the cover 120 engaging with the first external gears 111 are rotated about the first hinge axis G1, which is the center of the first external gears 111, and are simultaneously rotated about the second hinge axis G2, which is the center of the second external gears 123.

Further, the fourth external gears 134 of the damper 130 rotating together with the cover 120 control the opening speed of the cover 120 while rotating together with the second internal gears 112 of the housing 110.

Figure 3:
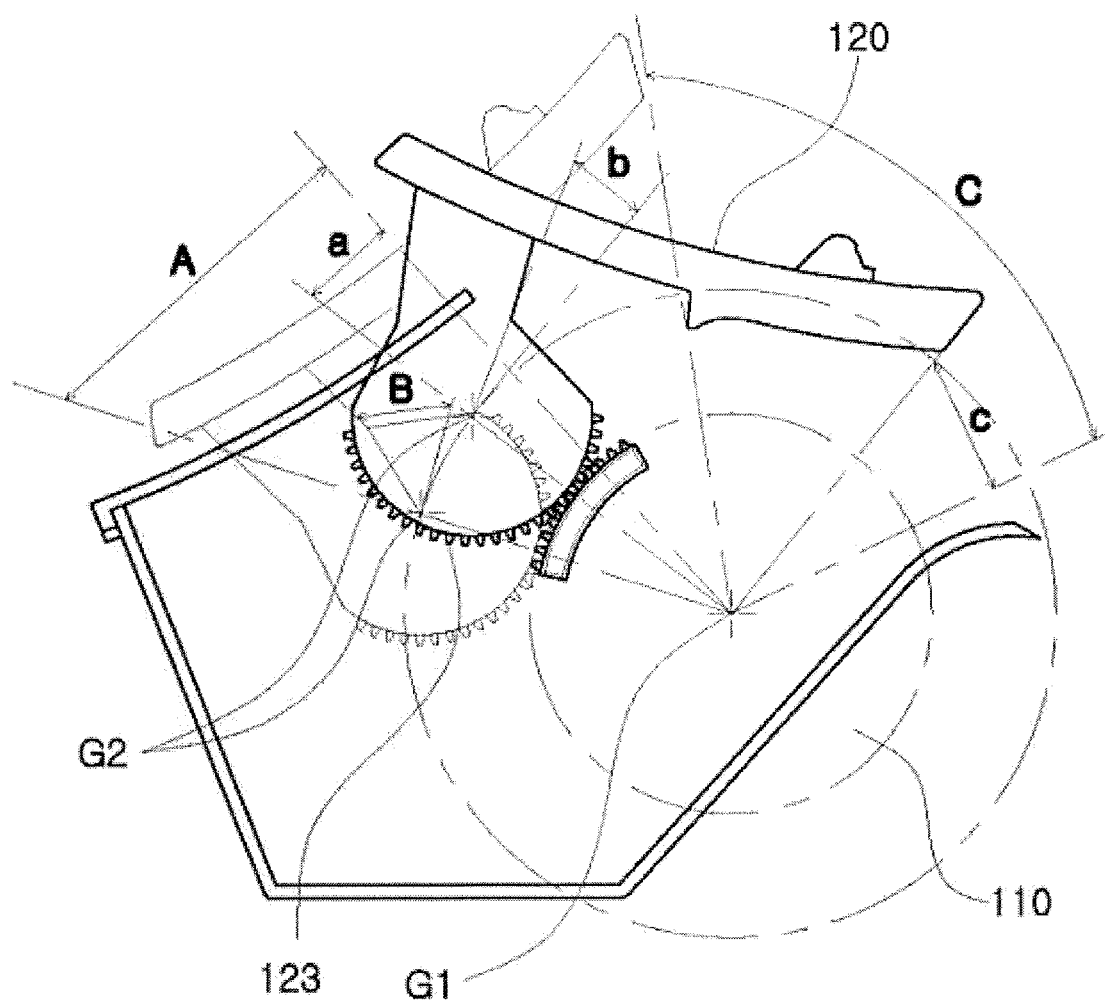
FIG. 3 is a side view of a main part of the console box in operation, according to the embodiment of the present invention.

FIG. 3 is a side view of a main part of the console box in operation, according to the embodiment of the present invention.

In the console box 100 according to the embodiment of the invention, when the cover 120 is changed from the locked state where the hook portion 124 engages the engaging portion 114 to an unlocked state, the cover 120 is automatically opened by elasticity of the torsion spring 140. While being opened, the cover 120 rotates about the first hinge axis G1 by as much as "a", that is, a gear ratio between the first external gear 111 and the third external gear 123, and at the same time rotates about the second hinge axis G2 by as much as "b", thereby totally rotating by as much as "c". As a result, a complete open angle of the cover is "C", which is the sum of "A" based on rotation of "a" and "B" based on rotation of "b".

In other words, when the cover 120 is opened from the locked state to the open state, the cover 120 rotates for the angle "A" relative to the first hinge axis G1, and at the same time, rotates relative to the second hinge axis G2 for the full range of the third external gear 123 engaging the first external gear 111. Therefore, the cover 120 opens for the full open angle "C" by rotating around the first hinge axis G1 and the second hinge angle G2 while the rotation trace or projecting position of the cover 120 when opening is kept as low as possible.

As such, the console box 100 according to this embodiment employs a two-point hinge structure instead of the one-point hinge structure, enabling a reduction in the rotation trace of the cover 120 and the degree of cover protrusion in a completely open state.

Although some embodiments have been described herein, it should be understood by those skilled in the art that these embodiments are given by way of illustration only, and that various modifications, variations, and alterations can be made without departing from the spirit and scope of the invention. Therefore, the scope of the invention should be limited only by the accompanying claims and equivalents thereof.

The application claims a priority of Korean Patent Application No. 2011-47437 filed on May 19, 2011, and the disclosure thereof is incorporated herein as a reference.

What is claimed is:

1. A console box comprising:
   a housing defining an article accommodating space therein and having an opening formed at a front side thereof;
   a cover having hinge couplers provided at opposite sides thereof, the cover being coupled to the front side of the housing through the hinge couplers;
   dampers, each being disposed between each of the hinge couplers of the cover and the housing and controlling an opening speed of the cover; and
   a torsion spring disposed between each of the hinge couplers of the cover and the housing and elastically supporting the cover,
   wherein the housing further comprises first arcuate external gears disposed at opposite sides thereof, and second arcuate internal gears disposed outside the first external gears to be concentric with the first external gears,
   the cover further comprises third external gears formed on circumferences of the hinge couplers at the opposite sides of the cover to engage with the first external gears, and
   each of the dampers is secured to an inner side of each of the hinge couplers of the cover, and is formed on an inner surface thereof with a fourth external gear engaging with the second internal gear of the housing corresponding thereto and arranged concentric with the corresponding third external gear.

2. The console box according to claim 1, further comprising: hinge covers, each being disposed outside the hinge coupler of the cover to prevent the cover and the torsion spring from separating from each other.

3. The console box according to claim 1, wherein the first and second arcuate gears have a common first hinge axis, and the cover has a second hinge axis in each center of the third external gears, the cover being opened around the first and second hinge axes as a combination.

4. The console box according to claim 3, wherein the torsion springs urge the cover to an open direction to open the cover, and
   the cover includes a hook portion and the housing includes an engaging portion engaging the hook portion so that when the cover is closed, the hook portion engages the engaging portion of the housing to maintain the cover at a locked state.

5. A console box comprising:
   a housing defining an article accommodating space therein and having an opening formed at a front side thereof;
   a cover having hinge couplers provided at opposite sides thereof, the cover being coupled to the front side of the housing through the hinge couplers;
   a damper disposed between one of the hinge couplers of the cover and the housing and controlling an opening speed of the cover; and
   a torsion spring disposed between one of the hinge couplers of the cover and the housing and elastically supporting the cover,
   wherein the housing further comprises a first arcuate external gear disposed at one of the opposite sides thereof, and a second arcuate internal gear disposed outside the first external gear to be concentric with the first external gear,
   the cover further comprises a third external gear formed on an circumference of one of the hinge couplers to engage with the first external gear, and
   the damper is secured to an inner side of the one of the hinge couplers of the cover, and is formed on an inner surface thereof with a fourth external gear engaging with the second internal gear and arranged concentric with the third external gear.

6. The console box according to claim 5, wherein the first and second arcuate gears have a common first hinge axis, and the cover has a second hinge axis in a center of the third external gear, the cover being opened around the first and second hinge axes as a combination.

* * * * *